(No Model.)  2 Sheets—Sheet 1.

G. E. S. PHILLIPS.
COMBINED SEED AND FERTILIZER DROPPER.

No. 284,892.  Patented Sept. 11, 1883.

WITNESSES:
Thos. Houghton.
A. G. Lyne.

INVENTOR:
G. E. S. Phillips
BY
ATTORNEYS.

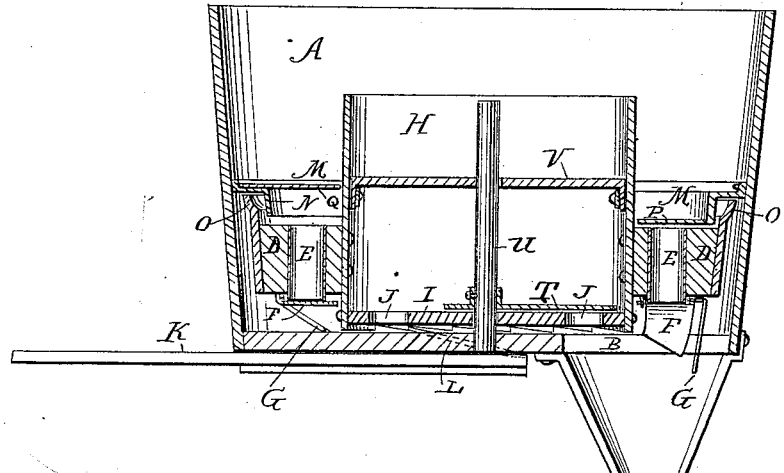

UNITED STATES PATENT OFFICE.

GEORGE E. S. PHILLIPS, OF BERRYVILLE, VIRGINIA.

COMBINED SEED AND FERTILIZER DROPPER.

SPECIFICATION forming part of Letters Patent No. 284,892, dated September 11, 1883.

Application filed May 31, 1883. (No model.)

*To all whom it may concern:*

Be it known that I, GEORGE E. S. PHILLIPS, of Berryville, in the county of Clarke and State of Virginia, have invented a new and useful Improvement in a Combined Seed and Fertilizer Dropper, of which the following is a full, clear, and exact description, reference being had to the annexed drawings, forming part of this specification.

This invention relates to rotary seed and fertilizer droppers; and the invention consists of the novel construction, hereinafter described and claimed.

Figure 1:
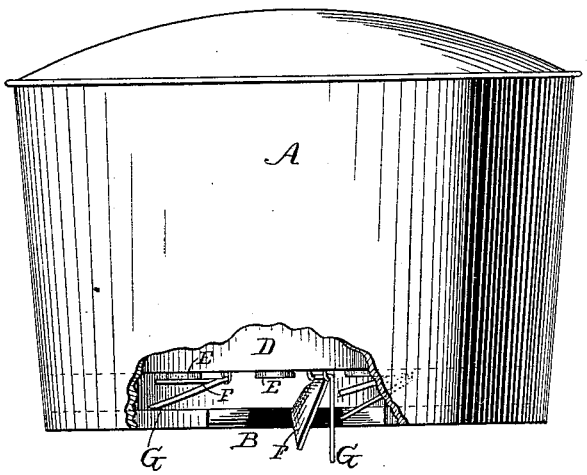
Figure 2:
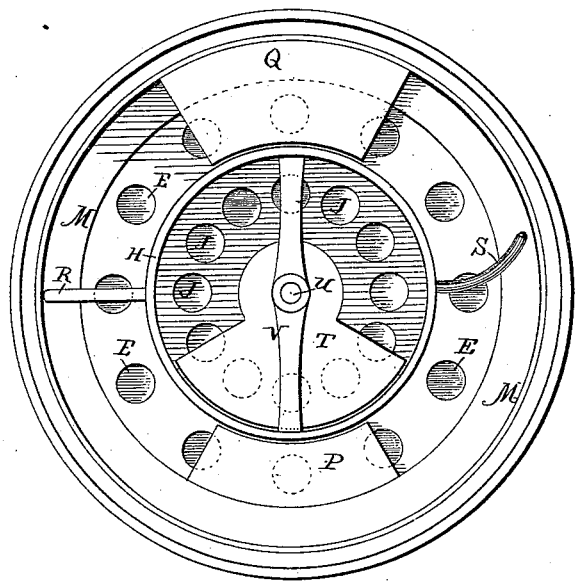

In the drawings, Figure 1 is a side elevation of my invention, partly broken away. Fig. 2 is a plan view with the tops removed. Fig. 3 is a vertical section, and Fig. 4 is a detail view.

A indicates a cylindrical hopper having an opening, B, and slots C formed in its bottom. On the bottom of this hopper is supported a rotary dropping device for fertilizer, consisting of a ring, D, having cups E arranged therein in regular order, and valves F, pivoted to the bottom of the ring and adapted to be held firmly against the lower ends of the cups, to hold the fertilizer therein by means of the downwardly-bent arms G, which are rigidly connected thereto and adapted to bear against the bottom of said hopper. When the ring D is rotated, the valves will successively drop open by gravity as they pass over the opening B in the bottom of hopper A.

Inside the ring D is secured a cylindrical hopper H for corn or other grain, which is provided with a stationary bottom, I, having cups or holes J formed through it, corresponding in number and position to the cups of the fertilizer-dropping device above described. The grain-hopper H is thus adapted to be rotated with the two combined droppers, and power is applied for rotating the same by means of a dropping-slide, K, having spring-catches L secured to its end, and arranged in contact with the ratcheted under surface of the bottom I through slots C in the bottom of hopper A. The two spring-catches L are secured to the slide K in such manner that one end of each shall be free, and the two free ends shall extend out from the slide in opposite directions to each other. With this construction, one of the catches will engage with a ratchet-tooth in the bottom of hopper H at each oscillation of the slide, so that an intermittent movement in one direction will be given to the droppers.

For cutting off the mass of fertilizer from the filled cups, I provide a ring, M, adapted to be fitted close to the inner surface of the hopper A and held in a given position thereby. This ring is made sufficiently large to lie without the circle of the cups E, and serves as a bearing for the ring D by means of a flange, N, engaging with a corresponding flange, O, on the ring D.

To the inner periphery of ring M is secured a plate or scraper, P, under which the cups E pass before reaching the discharging-opening B, and by which the mass of fertilizer is cut off from that in the cup. The ring M is provided with a plate, Q, arranged in a horizontal position for cutting up and disintegrating the fertilizer. The arms R S, secured to the hopper H, are intended to act as stirrers of the fertilizer.

For cutting off the mass of grain from that in the cups J, I provide a plate, T, which is rigidly secured to a pintle, U, which is secured to the bottom of hopper A, and extends up through an opening in the bottom of hopper H. This plate rests just above the bottom of hopper H, and is adapted to support the bulk of the grain. The hopper H is provided with a cross-bar, V, which serves as a bearing for the upper end of the pintle U.

Having thus described my invention, what I claim is—

The combined seed and fertilizer dropper consisting of the stationary outer hopper having slots in its bottom, the rotary inner hopper having the two cup-carrying devices secured, respectively, to its inner and outer surfaces, and provided with a ratchet under surface, the valves pivoted on spring-arms which bear against the bottom of the stationary hopper to close the bottoms of the cups, and the slide adapted to rotate the inner hopper, all arranged and combined together substantially as shown and described.

GEORGE E. S. PHILLIPS.

Witnesses:
H. C. LEVI,
J. K. MENDENHALL.